Sept. 21, 1965   J. T. BRADY   3,207,567
VEHICLE FLOOR ACCESSORY SUPPORT
Filed April 30, 1964
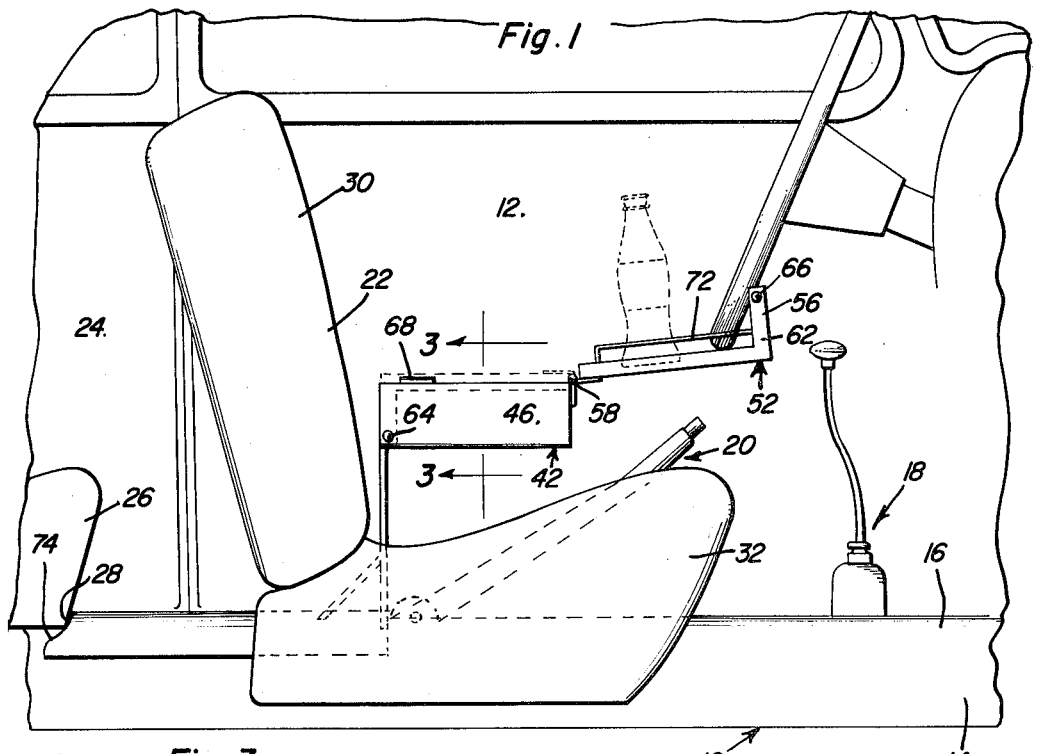
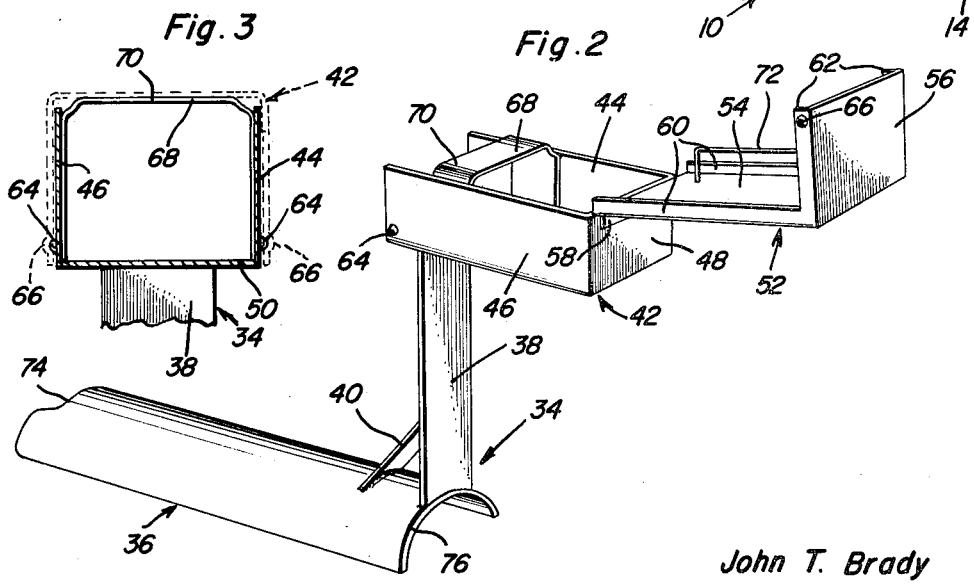
John T. Brady
INVENTOR.

3,207,567
VEHICLE FLOOR ACCESSORY SUPPORT
John T. Brady, 412 Cross St., Little Rock, Ark.
Filed Apr. 30, 1964, Ser. No. 363,852
11 Claims. (Cl. 312—235)

This invention relates to a novel and useful accessory support adapted primarily for use in motor vehicles of the type provided with laterally spaced or "bucket" seats.

In motor vehicles of the type including a flooring defining an upstanding hump extending longitudinally of the vehicle and including a pair of bucket seats supported from the flooring on opposite sides of the hump, a space is defined above the flooring hump between the upper portions of the bucket seats.

The accessory support of the instant invention is specifically designed to be positioned in this space wherein its presence will not be objectionable but instead useful for supporting a plurality of articles of various types. Further the accessory support includes an elongated base defining a downwardly opening channel and the support is adapted to be disposed over and to extend along the hump with the latter received in the channel defined by the base. The forward end of the base includes an upstanding support and article supporting means is carried by the upper end of the support and may be utilized to support various forms of articles. In addition, most motor vehicles provided with a longitudinally extending flooring hump and front bucket seats also include a transverse member of some type such as the lower forward edge portion of a rear seat which extends immediately above and transversely of the flooring hump a spaced distance rearwardly of the front bucket seats. The rear end of the elongated base of the article support of the instant invention is adapted to abut this transverse member in a manner preventing upward swinging movement of the rear end of the base and rearward sliding movement of the base relative to the flooring hump by which it is supported.

Additionally, motor vehicles of the type hereinbefore set forth are also frequently provided with hand brake actuating means which projects upwardly through the flooring hump at a point disposed between the bucket seats and the forward end of the elongated base of the article support of the instant invention is adapted to abut the hand brake actuating means for preventing forward sliding movement of the base of the article support. Finally, the upstanding support portion of the invention is adapted to be embracingly received between portions of the bucket seats disposed on opposite sides thereof for lateral support therefrom. Therefore, it may be seen that the article supports of the instant invention has been specifically designed so as to coact with the existing structural features of various types of automobiles in a manner enabling the article support to be readily removed from the associated vehicle and yet supported from that vehicle when in use in a manner maintaining the article support in a substantially stationary position against forces of inertia caused by rapid acceleration, deceleration and turning movement of the associated vehicle.

The main object of this invention is to provide an accessory or article support specifically designed for easy mounting in a motor vehicle in an unobtrusive manner.

Another object of this invention is to provide an accessory support in accordance with the preceding object and whose structural features enable the accessory support to be readily removed from the associated vehicle.

Yet another object of this invention is to provide an accessory support constructed in a manner so as to coact with existing structural features of various types of vehicles in a manner enabling the accessory support to be substantially stationarily supported in the associated motor vehicle without requiring fastening means of any type.

A final object of this invention to be specifically enumerated herein is to provide a vehicle accessory support constructed in accordance with the preceding objects which will conform to conventional forms of manufacture, be of simple construction and easy to install so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of the interior of the conventional form of motor vehicle provided with front bucket seats and showing the accessory support of the instant invention operatively mounted in position with portions thereof disposed between the front bucket seats of the vehicle;

FIGURE 2 is a perspective view of the accessory support with the closure cover of the receptacle portion thereof shown in an open position; and FIGURE 3 is an enlarged fragmentary transverse vertical sectional view taken substantially upon the plane indicated by the section line 3—3 of FIGURE 1.

Referring now more specifically to the drawings the numeral 10 generally designates a conventional form of motor vehicle including a driver's compartment 12 defining a flooring 14 including a longitudinally extending hump 16. The gear shift lever assembly 18 of the motor vehicle 10 projects upwardly through a forward portion of the humped portion of the flooring 14 as does the hand brake actuating lever assembly generally referred to by the reference numeral 20, the hand brake actuating lever assembly being disposed between the pair of laterally spaced "bucket" seats 22 disposed in the motor vehicle 10.

It may also be seen from FIGURE 1 of the drawings that the motor vehicle 10 includes a rear passenger compartment 24 in which a transversely extending seat portion 26 is disposed. The lower front edge portion 28 of the seat portion 26 defines a transverse member which is disposed immediately above and extends transversely of the rear portion of the hump 16.

Each of the bucket seats 22 includes an upright backrest portion 30 and a generally horizontally disposed seat portion 32. The accessory support of the instant invention is generally designated by the reference numeral 34 and includes an elongated base generally referred to by the reference numeral 36 and which is generally semi-cylindrical in configuration. The base 36 rests upon and embracingly engages the upper portion of the hump 16 and includes an upstanding support 38 at its forward end which is braced from the base 36 as at 40.

An open topped receptacle generally referred to by the reference numeral 42 is secured to the upper end of the upstanding or upright support 34 and includes a pair of opposite side walls 44 and 46 interconnected at their forward ends by means of a front wall 48 and at their lower marginal edge portions by means of a bottom wall 50. A closure cover generally referred to by the reference numeral 52 and including a top wall portion 54 and a rear wall portion 56 is hingedly supported from the upper portion of the forward wall 48 by means of a hinge assembly 58 which is also secured to the forward end of the top wall 54.

The opposite side marginal edge portions of the top wall 54 include downturned flanges 60 which overlap the upper portions of the external surfaces of the opposite side walls 44 and 46 when the closure cover 52 is in its closed position illustrated in phantom lines in FIGURE 1 of the drawings and the opposite side marginal edge portions of the rear wall 56 include forwardly directed flanges 62 which overlap the outer surfaces of the rear end portions of the side walls 44 and 46 when the closure cover 52 is in its closed position. In addition, the opposite side walls 44 and 46 each include an integral projection 64 which is snugly received within a corresponding recess 66 formed in the corresponding flange 62. Further, it may be seen that an inverted U-shaped brace 68 is secured within the receptacle 42 and that its bight portion 70 defines an abutment whose upper surface is adapted to engage the undersurface of the top wall 54 when the closure cover 52 is in its closed position. Still further, either one or both of the opposite side marginal edge portions of the top wall 54 may be provided with an article retaining fence 72 which depends from the undersurface of the top wall 54 when the closure cover 52 is in its closed position and projects upwardly from the top wall 54 when the closure cover 52 is in the open position illustrated in FIGURES 1 and 2 of the drawings.

It may be seen from FIGURES 1 and 2 of the drawings, that the rear portion of the semi-cylindrical base 36 is notched as at 74 and that this notched portion of the base 36 abuts against the front of the transveres member 28 and includes portions disposed below the transverse member 28 on opposite sides of the hump 16. Accordingly, the rear end of the base 36 is prevented from swinging upwardly as well as slipping rearwardly along the hump 16. In addition, the length of the base 36 is such that its forward end 76 is disposed immediately adjacent the rearmost portion of the hand brake actuating lever assembly 20 for engagement therewith to prevent the base 36 from sliding forwardly along the upper portion of the hump 16 disposed between the hand brake actuating lever 20 and the transverse brace 28. Finally, the width of the upstanding support 38 is such that it is snugly received between the seat portions 32 of the bucket seats 22 whereby lateral support for the upright support is provided. Accordingly, it may therefore be seen that the accessory support 34 may be quickly installed in the vehicle 10 and in a manner whereby its structural features will coact with the structural features of the interior of the vehicle 10 in a manner such that the accessory support is stationarily positioned within the vehicle 10 but in a manner whereby the accessory support 34 may be readily removed from the vehicle 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle of the type having a passenger compartment including a flooring defining an upstanding hump extending longitudinally thereof and from which a pair of seats are supported on opposite sides of said hump defining a space therebetween above said hump, said vehicle also including a horizontal transverse member disposed immediately above a portion of said hump spaced rearwardly of said seats, an accessory support comprising an elongated base, said base being disposed over, extending along and supported from said hump, the forward end portion of said base including an upstanding support disposed between said seats and engageable with the latter for lateral support therefrom with article supporting means carried by its upper end portion, the rear end portion of said base projecting rearwardly of said seats, said rear end portion and said vehicle including coacting anchoring means preventing upward swinging movement of the rear end portion of said base relative to said hump.

2. The combination of claim 1 wherein said seats include seat portions projecting above said hump and upright backrest portions, said upstanding support being disposed forwardly of said backrest portions.

3. The combination of claim 1 wherein said article support means projects forwardly of said upper end portion.

4. The combination of claim 1 wherein said vehicle also includes hand brake means projecting upwardly through said hump between said seats, the forward end of said base being adapted for abutting engagement with said hand brake means for limiting forward sliding movement of said base on said hump.

5. The combination of claim 1 wherein said vehicle also includes hand brake means projecting upwardly through said hump between said seats, said coacting means also including means preventing rearward shifting of said base relative to said hump, the forward end of said base being abuttingly engageable with said hand brake means for limiting forward sliding movement of said base on said hump.

6. In combination with a vehicle of the type having a passenger compartment including a flooring defining an upstanding hump extending longitudinally thereof and from which a pair of seats is supported on opposite sides of said hump defining a space therebetween above said hump, an accessory support comprising an elongated base defining a downwardly opening channel, said base being disposed over and extending along said hump with the latter received in said channel, the forward end of said base including an upstanding support with article supporting means carried by its upper end portion, said seats including seat portions projecting above said hump, said upstanding support being disposed between said seats for lateral support therefrom.

7. The combination of claim 6 wherein said seats also include upright backrest portions, said upstanding support being disposed forwardly of said backrest portions.

8. The combination of claim 7 wherein said article supporting means projects forwardly of said upper end portion.

9. The combination of claim 6 wherein said article supporting means defines an upwardly opening receptacle projecting forwardly of said upper end portion.

10. In combination with a vehicle of the type having a passenger compartment including a flooring defining an upstanding hump extending longitudinally thereof and from which a pair of seats is supported on opposite sides of said hump defining a space therebetween above said hump, an accessory support comprising an elongated base defining a downwardly opening channel, said base being disposed over and extending along said hump with the latter received in said channel, the forward end of said base including an upstanding support with article supporting means carried by its upper end portion, said seats including seat portions projecting above said hump, said upstanding support being disposed between said seats for lateral support therefrom, said article supporting means defining an upwardly opening receptacle projecting forwardly of said upper end portion, said receptacle including a hinged cover pivotally secured thereto for rotation about a horizontal axis extending transversely of the forward end of said receptacle for movement between a substantially horizontal position closing said receptacle and an open position rotated approximately 180 degrees from the closed position and with said cover substantially horizontally disposed and having its free end disposed forwardmost.

11. The combination of claim 6 wherein said base and said vehicle include coacting means preventing longitudinal sliding movement of said base relative to said hump.

References Cited by the Examiner
UNITED STATES PATENTS

| | | | |
|---|---|---|---|
| 2,510,244 | 6/50 | Moltrup | 248—121 |
| 2,692,638 | 10/54 | Castell | 297—194 |
| 2,897,974 | 8/59 | Cook | 211—74 |
| 3,048,457 | 8/62 | Haase | 108—44 |

FRANK B. SHERRY, *Primary Examiner.*

CHANCELLOR E. HARRIS, *Examiner.*